United States Patent
Goncalves de Aguiar et al.

(10) Patent No.: US 9,916,177 B2
(45) Date of Patent: Mar. 13, 2018

(54) PREDICTIVE WORKLOAD SCHEDULING WITH INTEGRATED ANALYTICS

(71) Applicant: INTERNATIONAL BUSINESSS MACHINES CORPORATION, Armonk, NY (US)

(72) Inventors: Murilo Goncalves de Aguiar, Americana (BR); Juscelino Candido de Lima, Jr., Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/830,267

(22) Filed: Aug. 19, 2015

(65) Prior Publication Data

US 2017/0052814 A1 Feb. 23, 2017

(51) Int. Cl.
*G06F 9/46* (2006.01)

(52) U.S. Cl.
CPC .................................. *G06F 9/46* (2013.01)

(58) Field of Classification Search
CPC ........................................................ G06F 9/46
See application file for complete search history.

(56) References Cited

U.S. PATENT DOCUMENTS

| | | | |
|---|---|---|---|
| 7,979,859 B2 | 7/2011 | Li et al. | |
| 8,621,477 B2 | 12/2013 | Ferdous et al. | |
| 8,949,659 B2 | 2/2015 | Sainath | |
| 9,699,049 B2 | 7/2017 | Gupta et al. | |
| 2010/0318859 A1 | 12/2010 | Augusto et al. | |
| 2014/0220168 A1* | 8/2014 | Perez | B29C 37/0007 425/161 |
| 2015/0227447 A1* | 8/2015 | Adachi | G06F 11/3409 358/1.14 |

OTHER PUBLICATIONS

Linux COmmando, How to move print jobs from one printer queue to another, 2009, <URL: http://linuxcommando.blogspot.com/2009/07/how-to-move-print-jobs-from-one-printer.html>.*

* cited by examiner

*Primary Examiner* — Charlie Sun
(74) *Attorney, Agent, or Firm* — Schmeiser, Olsen & Watts; John Pivnichny (57) ABSTRACT

A computerized predictive workload scheduling tool and methods for analytically implementing a predictive job schedule. The scheduling tool incorporates and uses analytics to leverage information from a plurality of data sources to anticipate and pro-actively correct computing system job failures before they occur. The predictive scheduling tool generates a job schedule, analyzes the job schedule for predictable failures and resolves the identified failures by amending the job schedule. The job schedule generated and analyzed by the scheduling tool is deployed, analyzed and resolved for errors as needed or identified to prevent failures from occurring.

17 Claims, 4 Drawing Sheets

PREDICTIVE WORKLOAD SCHEDULING WITH INTEGRATED ANALYTICS

TECHNICAL FIELD

This disclosure relates to a predictive workload scheduling tools having analytics capabilities.

BACKGROUND

Modern computer systems are utilized for a wide range of tasks. Many tasks are simple and may be performed in real time directly by a user. However, some tasks require long execution times, must be performed at various intervals or at inconvenient times, for example when a system has a light tasking load or during early morning or weekend hours. Basic scheduling devices have been utilized to run certain programs or jobs at various intervals or at specified run times. However, these systems do not provide adequate service or integrate seamlessly into specific product lines, nor provide appropriate service between multiple computing platforms in a networked environment.

Some, more complex computer systems may employ a system operator or administrator to oversee and verify that scheduled tasks are performing correctly and without error. The operator or administrator of the computer system only becomes aware that these tasks have been incorrectly performed, inadequately performed or have failed to perform after the failure has occurred. The system operator or administrator is incapable of identifying, predicting or pre-emptively avoiding task failures that may occur, before the failures happen. Thus, a need exists for an automated computer system capable of identifying, predicting and preemptively avoiding task failures from occurring before they actually happen, therefore allowing the system to continue to perform all future tasks smoothly and without interruption.

SUMMARY

A first embodiment of the present disclosure provides a method for analytically implementing a predictive job schedule, said method implemented by a processor of a computing system, the method comprising generating, by the processor a pre-planned job schedule having one or more scheduled jobs; identifying, by the processor, a scheduled job of the one or more scheduled jobs having an initial probability of a job failure occurring, said initial probability being greater than a pre-determined threshold; amending, by the processor, the pre-planned job schedule to an amended job schedule automatically without input by an operator of the computing system, said amended job schedule having an updated probability of the job failure occurring, wherein said updated probability is less than the pre-determined threshold; and executing, by the processor, the amended job schedule.

A second embodiment of the present disclosure provides a computer system comprising a processor, a memory couple to the processor, a computer readable storage device coupled to the processor, said storage device containing program code configured to be executed by the processor via the memory to perform a method for analytically implementing a predictive job schedule, the method comprising generating, by the processor a pre-planned job schedule having one or more scheduled jobs; identifying, by the processor, a scheduled job of the one or more scheduled jobs having an initial probability of a job failure occurring, said initial probability being greater than a pre-determined threshold; amending, by the processor, the pre-planned job schedule to an amended job schedule automatically without input by an operator of the computing system, said amended job schedule having an updated probability of the job failure occurring, wherein said updated probability is less than the pre-determined threshold; and executing, by the processor, the amended job schedule.

A third embodiment of the present disclosure provides a computer program product, comprising a computer readable storage device having a computer readable program code stored therein, said program code configured to be executed by a processor of a computing system to perform a method for analytically implementing a predictive job schedule, said method comprising generating, by the processor a pre-planned job schedule having one or more scheduled jobs; identifying, by the processor, a scheduled job of the one or more scheduled jobs having an initial probability of a job failure occurring, said initial probability being greater than a pre-determined threshold; amending, by the processor, the pre-planned job schedule to an amended job schedule automatically without input by an operator of the computing system, said amended job schedule having an updated probability of the job failure occurring, wherein said updated probability is less than the pre-determined threshold; and executing, by the processor, the amended job schedule.

DETAILED DESCRIPTION

Existing methodologies for pre-scheduling a plurality of one or more jobs, tasks or functions suffer from the inability to anticipate the status of the computing environment and available resources needed to perform a plurality of jobs at the time of executing the particular job, task or function being scheduled. Because of the inability of current methodologies and computing systems to proactively mitigate and adjust the performance of one or more jobs, tasks or functions in response to the state of the computing environment and the resources available, current methodologies regularly result in unwanted or unexpected errors and job failures. Accordingly, when errors and failures occur, system operators or administrators in charge of these computing systems are engaged to manually identify the causes of these errors after the fact. It would not be feasible or nearly impossible for a systems administrator or operator to ingest all of the information relating to the constantly changing computing environment, draw conclusions about upcoming scheduled jobs and perform this task at a speed necessary to keep up with the computing system in order to act proactively prevent the computing system from performing the scheduled jobs.

Embodiments of the present invention incorporate the use of analytics into the decision making functions of the computer processor to prevent errors and failures from occurring before they happen. Through the use of a scheduling tool with integrated analytics, the computer processor may no longer require a systems operator to re-perform previous jobs that failed, the processor may adjust the jobs or tasks being performed, in a manner that will prevent errors and failures due to a lack of resources, over dedicated resource, system maintenance, computing system errors, and non-functional or non-existent resources.

Figure 1:
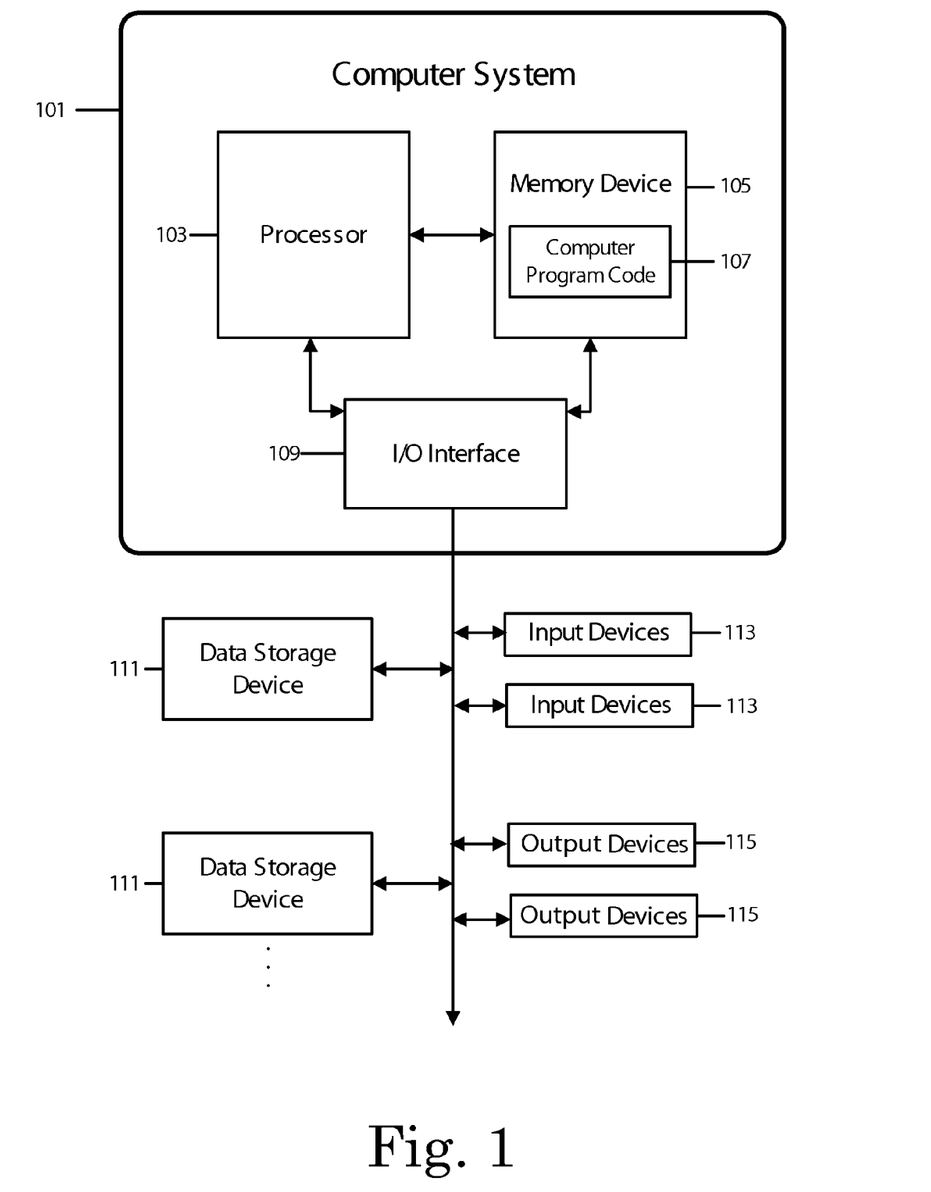
FIG. 1 depicts a block diagram of an embodiment of a computer system and computer program code that may be used to analytically implement a predictive job schedule.

FIG. 1 illustrates a structure of a computer system and computer program code that may be used to implement a method for analytically executing a predictive job schedule in accordance with embodiments of the present disclosure.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to the drawings, FIG. 1 illustrates an embodiment of a computer system 101 capable of performing a method for analytically implementing a predictive job schedule. The embodiment of the computing system may comprise a processor 103 coupled through one or more I/O Interfaces 109 to one or more data storage devices 111, one or more input or output (I/O) devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, cameras, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be connected to the computer system 101 either locally or at remote location from which they may be connected to I/O Interface 109 through a network interface or specialized hardware.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital (SD) memory cards, SIM cards, or other types of memory devices.

At least one memory device 105 may contain computer program code 107, which may be a computer program that comprises computer-executable instructions. The stored computer program code 107 may include a program that performs a method for analytically implementing a predictive job schedule in accordance with embodiments of the present disclosure, and may implement other embodiments described in this specification, including the methods illustrated in the FIGS. 1-4. In some embodiments, the data storage devices 111 may also store the computer program code 107. Processor 103 may execute the stored computer program code 107. In some embodiments of the computing system 101, the computer program code 107 stored in the storage devices 111 may be configured to be launched by processor 103 via the memory devices 105.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc. Thus the present disclosure discloses a process for supporting computer infrastructure, integrating, hosting, maintaining, and executing computer-readable code into the computer system 101, wherein the code in combination with the computer system 101 is capable of performing a method for analytically implementing a predictive job schedule.

Any of the components of the present disclosure may be created, integrated, hosted, maintained, executed, managed, serviced, supported, etc. by a service provider or a computing solution that offers a method to facilitate the implementation of a predictive job schedule analytics engine, allowing for a process of executing or integrating computing infrastructure and/or integrating computer-readable code into the computer system 101, wherein the code in combination with the computer system 101 is capable of performing a method for analytically implementing a predictive job schedule.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for analytically implementing a predictive job schedule, including program code 107 for a predictive scheduling tool, the program code 107 may be manually executed by loading the program code 107 directly into a client, server, proxy computers or other computing systems through a computer-readable storage medium (e.g., computer data storage device 111). Program code 107 may also be automatically, semi-automatically or manually executed by a computer system 101 by sending program code 107 to a central server (e.g., computer system 101) or to a group of central servers. Program code 107 may then be downloaded into client computers that connect to the central server and execute program code 107.

Alternatively, program code 107 may be sent directly to the client computer via direct or indirect file transfer. One such method for an indirect file transfer may include e-mail for example. Program code 107 may then either be detached to a directory on the client computer or loaded into a directory on the client computer by an e-mail option that selects a program that detaches program code 107 into the directory.

Another alternative may be to send program code 107 directly to a directory on the client computer hard drive, for example using a file transfer protocol (FTP) or other network sharing protocols to transfer the program code from one client to another or from a central server to a client. If proxy servers are configured, the process may select the proxy server code, determine on which computers to place the proxy servers' code, transmit the proxy server code, and then install the proxy server code on the proxy computer. Program code 107 may be then transmitted to the proxy server and stored on the proxy server.

In one embodiment, program code 107 for implementing a predictive job schedule using a computerized predictive scheduling tool may be integrated into a client, server and network environment by providing for program code 107 to coexist with software applications (not shown), operating systems (not shown) and network operating systems software (not shown) and then installing program code 107 on the clients and servers in the environment where program code 107 will function. The first step of the aforementioned integration of code included in program code 107 may be to identify any software on the clients and servers, including the network operating system, where program code 107 will be executed that may be required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number may be upgraded to the correct version.

A program instruction that passes parameters from program code 107 to a software application may be checked to ensure that the instruction's parameter list matches a parameter list required by the program code 107. Conversely, a parameter passed by the software application to program code 107 may be checked to ensure that the parameter matches a parameter required by program code 107. The client and server operating systems, including the network operating systems, may be identified and compared to a list of operating systems, version numbers, and network software programs that have been tested to work with program code 107. An operating system, version number, or network software program that does not match an entry of the list of tested operating systems and version numbers may be upgraded to the listed level on the client computers and upgraded to the listed level on the server computers. After ensuring that the software, where program code 107 is to be executed, is at a correct version level that has been tested to work with program code 107, the integration may be completed by installing program code 107 on the clients and servers.

Embodiments of the present disclosure may be implemented as a method performed by a processor of a computer system, as a computer program product, as a computer system, or as a processor-performed process or service for supporting computer infrastructure.

Figure 2:
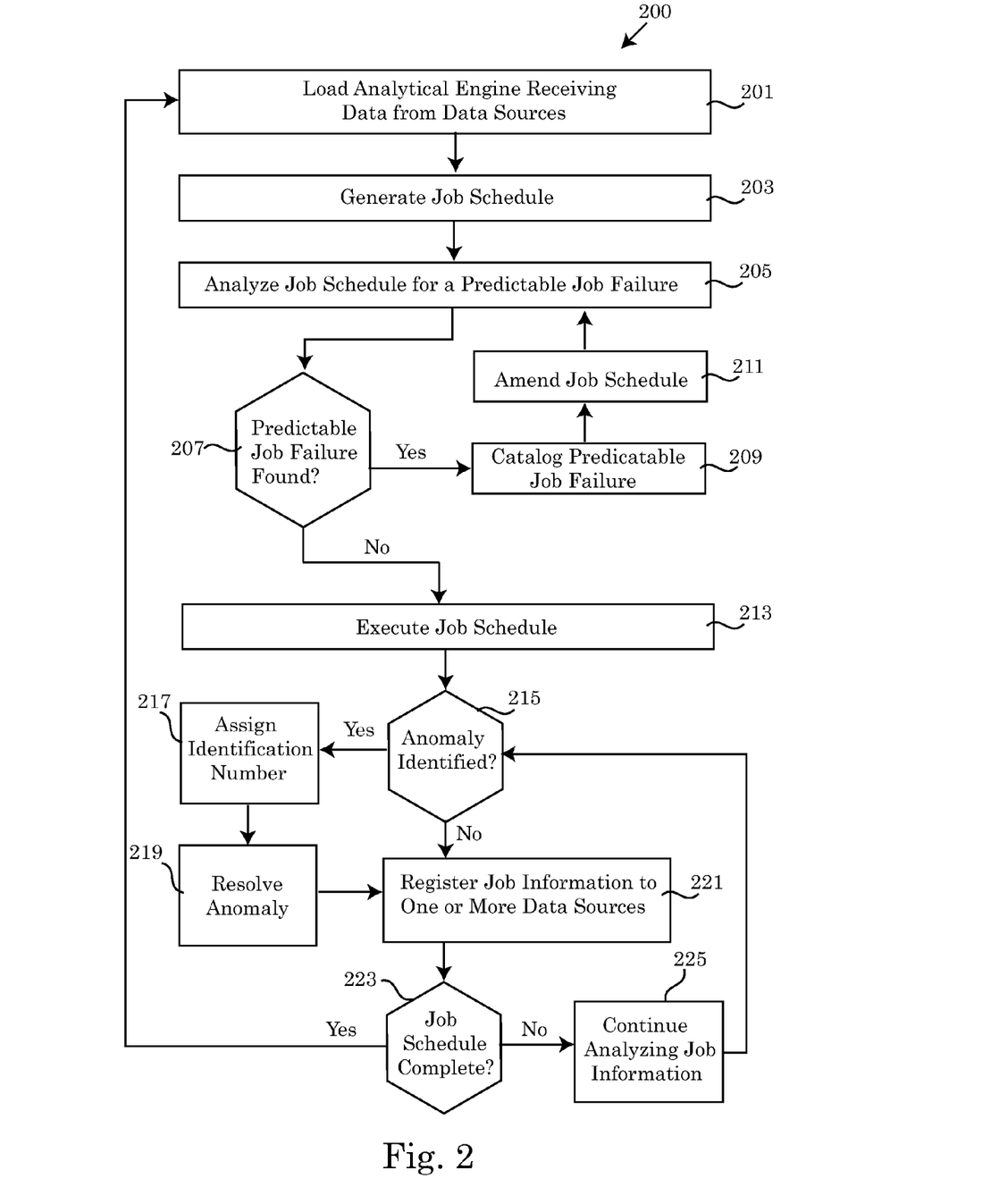
FIG. 2 depicts a flow diagram of an embodiment of a method for implementing a predictive job schedule.

Referring to the flow chart of FIG. 2, FIG. 2 provides an overview of the embodiment of a method for analytically implementing a predictive job schedule in which a computerized job scheduling tool utilizes analytical software, programs, applications or modules to generate and execute a job schedule free of errors and failures. The computerized job scheduling tool implementing embodiments of the methods described herein may be executed on a computing system or a network of computing systems such as an enterprise computing system having a central computing system networked to one or more client computing systems. In some embodiments, the computing system 101 may be a central server or series of central servers communicating with each of the clients connected thereto. Embodiments of the disclosure may implement procedures that vary from those specifically described in FIG. 2. For example, certain steps may be omitted, or performed in a different order. The examples specifically shown in FIG. 2, or any of the other figures in this disclosure should not be construed as limiting embodiments of the present disclosure. Furthermore, each of the steps in the algorithm of the figures, including FIG. 2-4 may be enabled and executed in any order by a computer processor executing computer code.

In some embodiments of the present disclosure, the computing system 101 may incorporate the method for analytically implementing a predictive job schedule by loading a predictive scheduling tool's program code 107 into the memory 105 of computer system 101. The term "job" may refer to any task performed by the computing system. The job may be performed in some embodiments by a single program, module, software application, service, etc. and in other embodiments; the job may be performed by a plurality of programs, modules, services and/or software applications.

Figure 4:
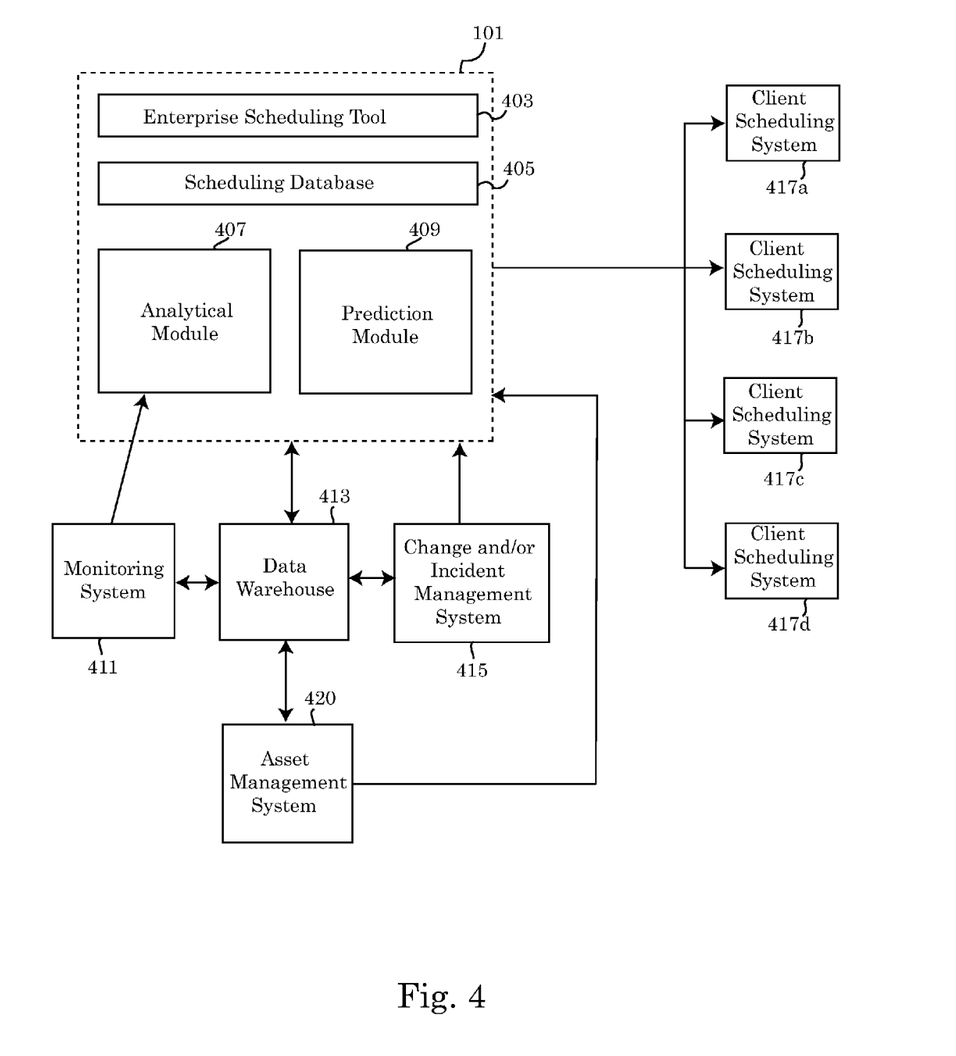
FIG. 4 depicts a block diagram of an alternative embodiment of a computer system implementing a predictive job schedule.

Referring to the drawings, embodiment 200 describes an embodiment of a method for analytically implementing a predictive job schedule, generated, executed, maintained, analyzed and adjusted by the scheduling tool. In step 201 of the method, the predictive scheduling tool may proceed by loading an analytics program code which may contain an analytics engine. In some embodiments, the predictive scheduling tool may include an analytics module 407 which may be integrated into the program code 107 of the predictive scheduling tool. In alternative embodiments, the analytics engine may be part of a separately accessed program, application, module, web service, etc. communicating with the scheduling tool, for example through a third party program utilizing an application program interface (API).

The analytics engine may include program code that utilizes a computing system 101 to perform data analysis on information received and stored by the computing system 101 or network of computing systems having the scheduling tool loaded, whereby a statistical analysis of data from the one or more data sources may be performed with the purpose of drawing conclusions about the information received by the analytics engine. Examples of the types of statistical analysis that may be performed may include predictive modeling or predictive analytics or supervised learning where the computing system is capable of predicting a target (outcome) variable (feature) using records (cases) where the target is known. Statistical or machine learning models are "trained" using the known data, then applied to data where the outcome variable is unknown. Includes both classification (where the outcome is categorical, often binary) and prediction (where the outcome is continuous). Other available methods of statistical analysis that may be used may include data mining, text mining or text analytics wherein collection of statistical and machine learning methods are used in conjunction with the data sources, including textual parsing cluster analysis, outlier detection and association rules. In some embodiments, the analysis performed may be a business intelligence analysis, which may extract useful information from the data sources without further statistical analysis or machine learning methods described above.

The information received by the analytics engine may be received from one or more data sources. The information provided to the analytics engine may then be subsequently analyzed, stored and/or retained by the analytics engine in one or more databases and/or data warehouses and may be recalled or queried at a later point in time. An example of multiple data sources in communication with a computing system 101 can be seen in the specific embodiment shown FIG. 4 wherein an enterprise scheduling tool 403 having access to a scheduling database 405, an analytical module 407, and a prediction module 409 loaded in the memory or storage device of computing system 101. As shown in FIG. 4, the computing system and more specifically the analytical module and scheduling tool may receive information from multiple data sources 411, 413, 415 and 420. For example, the monitoring system 411 may track and provide the analytical module with information related to computing system activity, system performance, system reports and alert the scheduling tool of failures or performance issues. This information may be sent directly to the computing system or it may be stored in a central repository such as data warehouse.

Another possible data source as shown in FIG. 4 may include a change management system and/or an incident management system 415 and configuration management systems, which may monitor the IT infrastructure of the enterprise computing system. For example, the change management system and the configuration management system may be engaged in monitoring an update to an existing IT environment, deployments of new infrastructure and record changes in configurations in one or more management databases or data warehouses. The change management system may be responsible for managing changes to IT processes related to hardware, communications equipment/communications software, system software, and documenting procedures for operating, supporting and maintenance of a computing system or network of computing systems.

In some embodiments, the computing system's change management system may include an integrated or built in incident management system. In other embodiments, the change management system may be separate and distinct system from the incident management system. While the change management system may manage changes to IT processes related to hardware, communications equipment/communications software, system software, and documenting procedures for operating, supporting and maintenance of a computing system or network of computing systems, the incident management system on the other hand may be responsible for identifying. analyzing and correcting hazards, errors and conditions of the computing system in order to prevent the incidents from occurring or re-occurring. In some instances, job failures may be one type of incident identified, analyzed, reported and corrected by the incident management system.

Another type of data source that may communication with and provide detailed information to the computing system 101, analytics engine or data warehouse 413 may be an asset management system 420. An asset management system 420 may be a physical or virtual computing system, software application, program, web service, etc. that may keep records relating to inventory, financial data, and contractual data in order to manage IT assets throughout the life cycle of the asset. The asset management system collects and reports information relating to IT assets and allows computing systems to manage vendors, software and hardware asset portfolios from the time of requisition through the time the assets are retired. The asset management system may monitor each asset's performance throughout the life cycle of the asset. The asset management system may include tools capable of automating manual processes relating to capturing, integrating and discovery of inventory, financial data and contractual data and reporting the information to a central repository such as a database or data warehouse.

The information collected by each of the data sources, including but not limited those described above and present in FIGS. 4 (411, 413, 415 and 420), may be sent to the computing system 101 or it may be stored in a central repository such as data warehouse 413 for further data analysis or reporting to the computing system. In some embodiments, the information collected and stored by the data warehouse 413 may include detailed or summary reports relating to the computing system, computing system performance and activities, and one or more incident management records, configuration management system records, and asset management system records.

Embodiments of the predictive scheduling tool may in some embodiments include hardware, software, virtual or physical interfaces, network components, infrastructure components or other entities that may allow the scheduling tool to communicate indirectly or directly with a set of locally stored or remotely accessible data sources. These data sources may comprise a combination of software applications, programs or modules, hardware systems, networked resources, virtual or physical resources, public or private databases, flat files, unstructured files or other information repositories and web services known to those skilled in the art. In some embodiments, the data sources being retrieved by the analytics engine may include historical data and operational data relating to the computing system 101 or network of computing systems, including performance and configuration information about individual client computing systems. The historical data retrieved by the analytical engine may include various logs recording the computer system status, including but not limited to monitoring logs, performance logs and network logs. Example of performance information that may be provided to the one or more data sources may include information collected by one or more sensors that are installed to computing system and are capable of collecting information about the hardware components and conditions of the computing system. These sensors may provide useful information regarding the overall health and performance of each computing system. The sensors may measure and record such information as processor performance, processor clocking speed, processor voltages, memory voltages, memory clocking, processor and/or ambient temperature of the computing system and fan speed. From the information collected by the sensors, stored in the data source, the analytics engine may determine the computing system's ability to identify each individual computing system's processing capabilities, the max parallel jobs capable of being performed and the intensity of the job that may be assigned, without overstressing the computing system.

The information being sent to the analytical engine may occur continuously as a constant stream of information from one or more data sources, at discrete time intervals providing refreshed updates, upon request by the analytics engine or scheduling tool or at a moment when the information in a data source has been updated to reflect a change.

The analytical engine may utilize the information supplied by each of the data sources to draw conclusions about the computer system, the computing system network, each individual client computing system, as well as the performance capabilities, reliability, and resources of the computing system and network. The conclusions drawn by the analytical engine from the data sources' information may be provided or transmitted to the scheduling tool. The information provided by the analytical engine to the predictive scheduling tool may be transmitted: upon request, as a constant stream of information, at discrete time intervals, at times when new conclusions have been reached by the analytical engine or a combination of times thereof. For example, in some embodiments, the predictive job scheduling tool may receive information from the analytical engine prior to the creation of a job schedule, prior to the execution of a job schedule, throughout the execution of the job schedule or at each of these moments.

In step 203, the scheduling tool may be generating a job schedule which may include one or more jobs scheduled to be performed over a designated period of time. Each scheduled job may include a designated start time, completion time, and designated computing system or resources that will be handling the performance of the job.

Embodiment of the job schedule may be a pre-planned job schedule including one or more batches of one or more jobs to be performed at certain times or intervals over a designated period of time, such as a 12 hour, 24 hour, 48 hour or longer period of time. Each of the jobs in the generated job schedule may be assigned to and performed by one or more computing systems 101. For example, if the scheduling tool is part of an enterprise system which may be networked to a plurality of client systems 417a, 417b, 417c, 417d, the predictive scheduling tool loaded on the enterprise system (such as a central server or mainframe) may designate which client computing system will perform each job. Depending on the resources available to the one or more computing systems, a single job may be performed at a time or a plurality of jobs may be performed simultaneously or in parallel with one another. For example, in a situation where only a single computing system is available, the single computing system may perform a single job at a time, a single computing system may perform multiple jobs simultaneously or stagger the job times to occur during overlapping periods of time. Likewise, the scheduling tool having resources at its disposal for performing jobs on multiple client computing systems as part of a network of computing systems, may schedule one or more jobs to be simultaneously or near simultaneously performed by each client computing system in some embodiments. In other embodiments, the scheduling tool may have each client computing system performing a job at separate times, at the same time, at staggered times in parallel, or multiple jobs may be performed at various times that may or may not overlap with the performance of a job by another client computing system on the network.

The resources available to the computing system 101 or network of computing systems may be taken into account by the analytics engine and may influence the step of generating the job schedule by the job scheduling tool. Based on the information received from the analytics engine, the conclusions drawn can inform the scheduling tool about the threats, performance and expected outcomes of job schedules proposed by the scheduling tool. Once a job scheduling tool has generated the job schedule or during the generation of the scheduling process, the scheduling tool may proceed by analyzing 205 the generated job schedule and identifying one or more predictable job failure.

Embodiments of method stop of analyzing the job schedule and identifying said job schedule for a scheduled job that may have a high probability of likelihood of failure. Embodiments of this step may assess each schedule job based on the information received by the analytic engine and the statistical conclusions drawn from the data. Using the information ingested by the analytic engine it may be determined that there is a statistical level of certainty that if the job schedule was performed in its current incarnation, one or more jobs would fail.

Whether or not the statistical level of certainty is high enough to warrant amending the pre-planned job schedule may be based on a pre-determined, pre-programmed or adjustable threshold level, wherein if the probability of failure is greater than the pre-determined threshold level, the computing system may amend the pre-planned job schedule to reduce or eliminate the probability of a job failure.

The acceptable threshold level for the probability of failure may vary from embodiment to embodiment. The threshold may be a pre-determined or programmed into the computer code of the scheduling tool and/or analytics engine Examples of a predetermined threshold may be a simple majority, such as when the statistical probability of failure is considered greater than or equal to 50%. In other embodiments, the cut off point for a job failure considered being highly probable or unacceptably elevated, and thus warranting an amendment to the job schedule may be when the probability is greater than 5%, 10%, 20%, 30%, 40%, 50%, 60%, 70%, 80%, 90%, 95% or 99% statistical certainty of a job failure occurring.

For example, based on hypothetical historical data from the data sources provided to the analytics engine, it may be statistically relevant that under circumstance where a client computing system is assigned a job and the client computing system is offline or inoperable at the time the job schedule is executed may be 95%, where only 5% of client systems may be known to become operable once again and successfully perform the task assigned. The analytics engine may view that 95% chance of failure as a high probability and therefore preemptively adjust or amend the job schedule in order to reduce the probability of failure, for example by reassigning the job to a computing system that is expected to be reliably operable at the time of execution.

In step 207, if a predictable job failure is identified during the analysis of step 205, the predictable job failure and the conditions surrounding the job failure may be cataloged by entering the information about job failure into one or more data sources, such as a database, data warehouse or historical log file. The data source receiving the data and information regarding the predictable job failure in step 209 may be any data source that is available to the analytics engine described above. The updated entry describing the conditions and reasons for the predicted job failure may assist the analytics engine to draw different or revised conclusions, and/or alter the statistical analysis of the data sources. Changes, updates and revisions to the information analyzed by the analytics engine may in turn impact future job schedules generated by the scheduling tool, in order to prevent the job scheduling tool from generating the same predictable failure or error multiple times.

Job failures predicted before implementing or executing the job schedule for performance may occur for a multitude or reasons. Reasons for job failures may include, but are not limited to the job schedule being predicted to consume too many resource or resources in excess of those available to the computing system, jobs being scheduled on client computing systems that are down or unavailable, jobs being expected to take a longer allotment of time that originally anticipated, expiration of licenses to software and/or resources intended to perform the job or unavailability of resources on the computing system assigned to perform the job, including unavailable hardware or software or outdated versions of hardware or software.

In response to the predictable job failures, the scheduling tool may amend the generated job schedule in step 211 in order to resolve those predictable failures that may have a probability of failure that exceeds the acceptable threshold level of the computing system executing the program code of the analytics engine or scheduling. Amending the pre-planned job schedule to an amended schedule may be performed by the scheduling tool and in a manner that may reduce the probability of a job failure occurring in the amended job schedule such that it is less than the threshold level.

For example, under an originally generated job schedule, the scheduling tool may have predicted job failures due to an expectation that the job schedule created would over-utilize the resources available to the computing system. For instance, the original job schedule may have scheduled 10 parallel tasks to be performed by a computing system or network of computing systems. However, based on historical performance information provided to the analytics engine from a data source, it was determined by the scheduling tool that the amount of parallel processes have a 95% probability of utilizing the maximum amount of the processor's processing power. In this example, the threshold level for acceptable risk of failure may be set to less than 10%. The analytic engine may subsequently determine based on the historical performance data that running 8 parallel jobs has less than a 5% chance of utilizing the maximum amount of processing power, which is less than the 10% threshold. Accordingly, at the stage of amending the job schedule, the scheduling tool may reduce the number of parallel jobs being performed to an amount that has historically been identified by the analytics engine to be within tolerable range for the computing system or a comparable computing system to perform without the risk of over-utilizing available resources.

In another example, the scheduling tool may identify from information and conclusions drawn from the analytics engine that the scheduling system has assigned a job to be performed by a client computing system during a time when the computing system is unavailable or scheduled to be unavailable (for example due to scheduled maintenance), thus predicting that the job will fail with 99% certainty (based on past historical data) if the assigned computing system remains scheduled to perform the scheduled job. In response, during the amending step 211, the scheduling tool may correct the predictable failure by assigning the job to another computing system anticipated to be available at the time the job is scheduled for performance, rescheduling the performance of the job to a time when the unavailable computing system is expected to be available again, remove the job from the job schedule or putting the implementation of the job scheduled on hold.

In addition, not only may the scheduling tool predict and resolve the occurrence of job failures or errors before the execution of the generated job schedule, the scheduling tool may also use the historical data and information from the one or more data sources to optimize the performance of the computing system or network of computing systems. This step of optimizing the computing system may include identifying the optimal job schedule based on the resources available and/or the most cost effective job schedule. In some embodiments, the optimal job schedule may be the schedule that can be performed the fastest, performed with the least amount of total resources, least power consumption or least amount of processing power required. In some embodiments, the optimal job schedule may include spreading each of the jobs scheduled to be performed across the most computing systems available. The scheduling system may use the information from the analytics engine to determine which jobs are the most resource intensive and may assign those resource intensive jobs to one or more computing systems having the resources most suited for completing the job. In some embodiments, the optimal job schedule may not be the most cost effective solution. For example, a job schedule may be performed without utilizing one or more client computing systems. Likewise, since the client computing systems are not utilized to perform a job or task, they may be left in a low power state to reduce operation costs. Moreover, certain client computing systems may not be needed to perform certain tasks that require licensed products such as hardware or software. By identifying the a job schedule that limits specific jobs needing specialized licensed software or hardware to complete a job, the scheduling tool may reduce the need to pay additional licensing fees because only the optimal number of computers may include the licensed products. Accordingly, based on the analytics engine's receipt of historical data of the computing systems, the scheduling tool may identify and assign specific jobs only to the computing systems with the licensed products available for completing the job. In some embodiments, the scheduling tool may disable one or more client computing systems (417*a,b,c,d*) that may not have any scheduled jobs to run on it. Moreover, in alternative embodiments, a scheduling tool may enable or re-enable the client computing system (417*a,b,c,d*) once the analytical system or scheduling tool has identified a future scheduled job to run on the client computing system.

In some embodiments, the predictive scheduling tool performing the method 200 for analytically implementing a predictive job schedule may further comprise step 213 which includes the step of executing the job schedule generated and/or amended by the predictive scheduling tool in steps 203 and 211. This execution step 213 may occur in some embodiments after the scheduling tool has determined that there will not be predictable failures that will occur once the job schedule is executed and performed by the computing system or network of computing systems. The step of executing the job schedule 213 may include a step of the scheduling tool requesting or issuing a command via the processor to one or more computing systems or clients to perform one or more of the specified jobs of the job schedule. The requests or commands to perform a specific job may include a start time and an end time for completing one or more jobs of the job schedule and/or a request for the resources needed to perform the specific job. Each of the tasks requested by the scheduling tool may include a request or command for a computing system to perform the task using one or more programs, applications, modules, services, or other software, loaded into local or remotely accessible memory or storage devices on one or more computing systems, or a piece of hardware installed on the computing system to perform one or more specific tasks at one or more particular time periods.

In some embodiments, the scheduling tool may be part of an enterprise computing system that utilizes enterprise software which may be designed for performing tasks across an entire enterprise system or network, utilizing the processing power of each client computing system in the network to perform the task or part of the task required by the executed job schedule. An exemplary embodiment of the enterprise system is shown in FIG. 4. The enterprise system may include an enterprise software package or suite, including the predictive scheduling tool as part of a collection programs having common business applications and development tools unique to the organization employing the tools.

The job schedule executed by the scheduling tool may include customized or organization specific tasks that are requested to be performed by the job scheduling tool. Even though the jobs or tasks may be unique to the specific computing systems employing the job scheduling tool, the analytics module containing the analytics engine may understand and analyze the nuances and resource requirements of each of the specific computing systems to ensure that failures do not occur. The jobs requested or commanded by the scheduling tool to be performed by computing systems that are part of the enterprise network may include but not limited to such management and updating of payment processing, automated billing systems, product catalogs, security, IT service management, customer relationship management, resource management, business intelligence, project management, collaboration, human resources, manufacturing form automation, application integration, extract transfer and load actions.

In some embodiments, the scheduling tool may continue to analyze and monitor the computing system or network of computing systems performing each job or task or directed to perform the job or task at a later point in time, as well as continue to analyze the pre-planned job schedule generated 203 or amended job schedule 211. Embodiments of the method 200 may include this step of analyzing and identifying anomalies 215 during the execution of the job schedule 213 in effort to predict and resolve any anomalies that may occur. Each of the said anomalies may be identified as having a probability resulting in one or more job failures that is greater than the pre-determined threshold of statistical certainty of a job failure occurring, if the executed job schedule is not resolved before the job is performed. The continued analysis by the scheduling tool of the job schedule or amended job schedule, even after the execution thereof may be possible in some embodiments because even as the scheduling tool is performing the steps of the method 200, the scheduling tool and analytics engine may continuously receive updated information from the data sources. The data sources feeding information about the computing systems may be continuously updated during the operation of the computing systems and constantly changing or being amended as the computing system, network of computing systems or individual client systems of the network are being utilized, remaining idle or are upgraded to increase the overall resources and processing power available.

Based on the information received from the data sources and the conclusions drawn by the analytics engine. The scheduling tool may be capable of forecasting anomalies and the statistical probabilities that the computing system might face one or more job failures. A computing system or a network of computing systems may be constantly fluctuating in terms of resources being utilized and the availability of those resources at any point in time, including hardware or software resources, both physical and virtual. Embodiments of the scheduling tool monitoring the changes in the computing system may identify a new anomaly that could result in a job failure that may not have been present at the time the job schedule was executed. In view of the newly discovered anomaly by the scheduling tool, the anomaly may need to be resolved during the execution of the job schedule rather than prior to the execution step 213. For example, at the time the job schedule was generated, every computer client may have been online and working properly, however once the job schedule was executed, one or more computing system clients may have gone offline or malfunctioned and hence becomes incapable of performing one or more jobs assigned to the computing system as part of the job schedule.

Accordingly, once a data source receives information of the offline or malfunctioning computing system, this information will be provided to the analytics module, wherein said analytics engine draws the conclusion that the jobs scheduled for the particular client system cannot be performed by theses malfunctioned or offline computing systems, as originally scheduled. Additional embodiments of anomalies that may be identified and prevented, these anomalies may include scheduling too many parallel jobs resulting in an over utilization of computing resources, longer than expected time needed to complete a job, scheduled computing systems unexpectedly offline, inoperable or scheduled for maintenance, insufficient resources on a scheduled computing system, including insufficient hardware or software, computing system power outage. Moreover, some embodiments of anomalies may not necessarily be conditions that would negatively impact the computing system. For example, an upgrade to the computing system will allow for the computing system to increase the number of jobs performed, performing the jobs at faster rates or even reducing the number of computing clients necessary to complete the job schedule. In some embodiments, the scheduling tool may identify that one or more computing systems may not be needed to perform the jobs of the job schedule or that they have not been needed to perform scheduled jobs for a certain period of time. In response, the scheduling tool will no longer schedule those unnecessary computing systems to perform jobs in order to save on licensing costs and reduce consumption of processing power.

In response to the identification of one or more anomalies, the scheduling tool may address these new anomalies that could result in one or more job failures by resolving 219 the anomalies in a manner that would predictively prevent the failure(s) from occurring by reducing the probability of the anomaly resulting in a job failure below the pre-determined threshold for failure or by eliminating the probability of failure from the presence of the anomaly. In some embodiments, the resolving step may occur automatically, without any input from an operator or administrator of the computing system. In other embodiments, the computing system operator may receive notification of the presence of the anomaly and the predicted probability of a failure. In some embodiments, this notification may simply update the system operator that the computing system has automatically corrected and avoided the predicted failures. In other embodiments, the computing system may request system operator permission to resolve the predicted job failures.

Embodiments of the step of resolving the anomaly 219 of the executed job schedule by reassigning one or more scheduled jobs to a different computing system, delaying the performance of the job, extending an allotted time to perform the job, rescheduling the performance of the job, cancelling the job from occurring and/or disabling an inoperable or a superfluous client system. In some embodiments, the scheduling tool may temporarily or permanently adjust the hardware capabilities of the computing system or client computing system in order to compensate and resolve the anomaly. For instance, the scheduling tool may be able to increase the processing power of the computing system by overclocking the processor or memory of the computing system. This adjustment may be made based on information recorded in the data sources from one or more sensors in order to identify a safe overclocking range. In other embodiments, the scheduling tool may be capable of increasing the cooling capabilities of the computing system where a job is scheduled in order to further attain higher processing or performance capabilities to complete a scheduled job. For example, in some embodiments, the scheduling tool may increase the fan speed of the computing system to further cool the system and remove heat built up around the hardware of the computing system.

Figure 3:
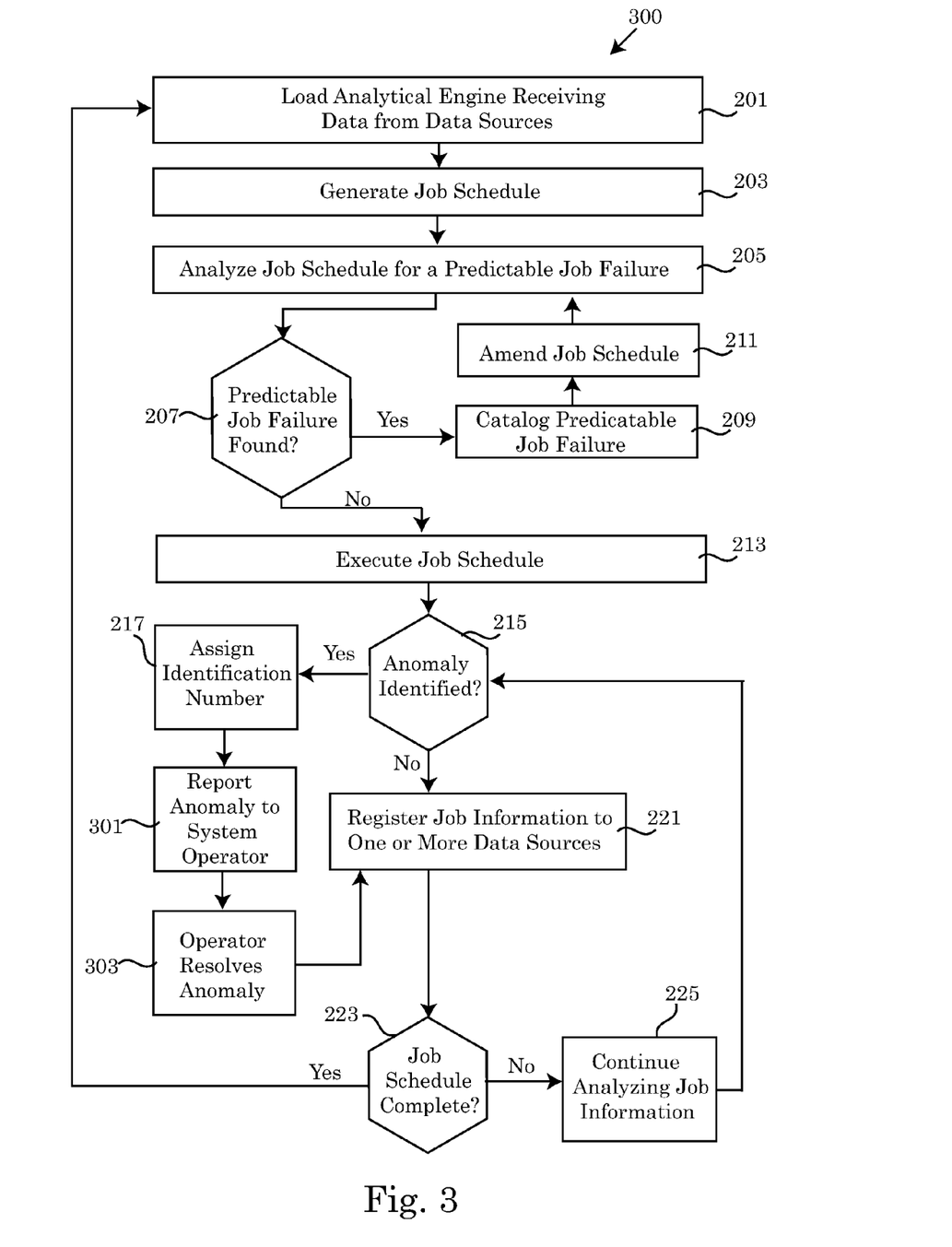
FIG. 3 depicts a flow diagram of an alternative embodiment of a method for implementing a predictive job schedule.

In some embodiments, the step of resolving each anomaly identified may be preemptively performed automatically by the job scheduling tool. In an embodiment where the resolving step is performed automatically without intervention or assistance from a third party such as an operator capable of controlling the predictive scheduling tool. In some embodiments, the job scheduling tool may submit a summary or notification to the system's operator overseeing the performance and maintaining the computing system or network of computing systems. In alternative embodiments, the job scheduling tool which has identified an anomaly may report the anomaly to the operator and wait for instructions for resolving the anomaly from the operator. In yet another alternative embodiment, the job scheduling tool may report the anomaly 301 to the system's operator. Subsequently, the system's operator may resolve the anomaly by manually adjusting the job schedule, or by issuing commands to the computing system that would resolve the anomaly.

Embodiments of the predictive scheduling tool may organize, categorize and save information regarding anomalies identified during the execution of the job schedule, to one or more data sources feeding information to the analytics engine. By providing up to date information relating to the anomalies as they are identified, and the circumstances surrounding their identification, this historical data may aid the scheduling tool in generating future job schedules. The information stored about the conditions giving rise to the anomalies may improve the functionality of the predictive scheduling tool by reducing or eliminating possibilities that an identified anomaly may repeat itself or occur again as part of the executed job schedule. In some embodiments, once an anomaly has been identified, the anomaly and the operating conditions of the computing system or network that gave rise to the anomaly may be recorded, stored and/or assigned an identification or reference number 217. The step of assigning an identification number 217 to each anomaly identified may help organize each instance of an anomaly being registered in one or more data sources 221 and allow the computing system, analytics engine or users of the computing system to perform a search and/or a query of the particular anomaly information by the registered identification number. The use of identification numbers to catalog each anomaly in a data source may allow for any organized manner for the information recorded to be looked up or recalled.

Once a job has been resolved of any anomalies that may have been identified by the scheduling tool, the job may be performed in the manner according to the job schedule or amended job schedule by the computing system or client designated by the predictive scheduling tool. In an effort to improve the predictive capabilities and accuracy of the scheduling tool and analytics engine, embodiments of the scheduling tool may register 221 or record information about each job performed by the computing system to one or more data sources accessible to the analytics engine. Information registered to the data sources may include the task being performed, the computing system performing the task, computing resources required to perform the task such as processing power, memory, energy consumption, specialized hardware or software, the time required to complete the job, including start time and time of completion, current condition of the computing system including the number of parallel jobs being performed at the same time, and whether or not the job performed was successful or a failure. Accordingly, the scheduling tool may continue to analyze the job information 225 provided to the data sources and analytics engine in order to identify additional anomalies that may occur in one or more of the jobs scheduled. In some embodiments, the analysis of the data sources containing information about the jobs and the computing systems may continuously occur until each of the jobs schedule has been performed in its entirety.

Upon completion of the job schedule 223, the job scheduling tool may repeat the method and generate a new or updated job schedule to be executed. In some embodiments, the job scheduling tool may be simultaneously generating and/or executing multiple job schedules across the computing system or network of computing systems. In some embodiments, a plurality of job schedules may be created, amended, executed, resolved or completing at multiple stages in parallel with one another. Each job schedule performing the method steps may be providing data to the data sources feeding information to analytics engine. This may allow for job schedules performing jobs at various stages to influence a yet to be created or recently created job schedule, being performed in parallel.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed is:

1. A method for analytically implementing a predictive job schedule, said method implemented by a processor of a computing system, the method comprising:

retrieving, by the processor, health and performance information of each client computer in a network of computers via sensors measuring and recording the health and performance information, including the each client computer's processor speed, memory clock speed and voltage;

generating, by the processor, a pre-planned job schedule having one or more scheduled jobs being performed by the each client computer in the network of computers up to a maximum number of parallel jobs;

identifying, by the processor, the one or more scheduled jobs having an initial probability of a job failure occurring due to insufficient resources available to the network of computers;

amending, by the processor, the pre-planned job schedule to an amended job schedule automatically, without an input by an operator of the computing system, said amended job schedule having an updated probability of the job failure that is less than a pre-determined threshold;

commanding, by the processor, the each client computer of the network of computers that is unassigned to a job of the amended job schedule to enter a low power state;

executing, by the processor, the amended job schedule;

analyzing, by the processor, the amended job schedule for a presence of an anomaly identified during the executing, by the processor, the amended job schedule, wherein the presence of the anomaly increases the updated probability of the job failure occurring to greater than a pre-determined threshold;

resolving, by the processor, the anomaly of the amended job schedule, wherein the resolving eliminates a probability of the job failure automatically, without the input of the operator of the computing system, wherein the resolving includes:

identifying a safe overclocking range based on information recorded in data sources from one or more sensors among the sensors;

increasing a processing power of the each client computer by overclocking a processor or memory of the each client computer based on the identified safe overclocking range; and in response to the increasing the processing power of the each client computer by overclocking the processor or memory of the each client computer based on the identified safe overclocking range, registering, by the processor, characteristics of the anomaly.

2. The method of claim 1, wherein the pre-planned job schedule includes one or more batches of jobs scheduled to be performed over a duration of time defined by the operator of the computing system.

3. The method of claim 1, wherein the identifying is performed by the processor executing program code for an analytics module performing a statistical analysis of the health and performance information.

4. The method of claim 1, wherein the resolving the anomaly includes delaying performance of a scheduled job from the one or more scheduled jobs, extending an allotted time to perform the scheduled job, rescheduling a performance start time of the scheduled job, reassigning the scheduled job to a different client computer from the network of computers, cancelling the scheduled job or disabling an inoperable client computer from the network of computers.

5. The method of claim 1, wherein the anomaly identified is selected from a group consisting of an overutilization of the computing system's resources, an inoperable client computer from the network of the computers, and insufficient client computer resources.

6. The method of claim 1, further comprising a step of communicating a status of the anomaly, by the processor, to the operator of the computing system.

7. The method of claim 1, further comprising providing at least one support service for at least one of creating, integrating, hosting, maintaining, and deploying computer-readable program code in a computing system, where the computer-readable program code in combination with the computing system is configured to implement the retrieving, the generating, the identifying, the amending, the commanding, and the executing.

8. A computer system comprising;
a processor;
a memory coupled to the processor;
sensors placed in electronic communication with the processor;
a computer readable storage medium coupled to the processor, said storage medium containing program code configured to be executed by the processor via the memory to perform a method for analytically implementing a predictive job schedule, the method comprising:
retrieving, by the processor, health and performance information of each client computer in a network of computers via the sensors measuring and recording the health and performance information, including the each client computer's processor speed, memory clock speed and voltage;
generating, by the processor, a pre-planned job schedule having one or more scheduled jobs being performed by the each client computer in the network of computers up to a maximum number of parallel jobs;
identifying, by the processor, the one or more scheduled jobs having an initial probability of a job failure occurring due to insufficient resources available to the network of computers;
amending, by the processor, the pre-planned job schedule to an amended job schedule automatically, without an input by an operator of the computing system, said amended job schedule having an updated probability of the job failure that is less than a pre-determined threshold;
commanding, by the processor, the each client computer of the network of computers that is unassigned to a job of the amended job schedule to enter a low power state;
executing, by the processor, the amended job schedule;
analyzing, by the processor, the amended job schedule for a presence of an anomaly identified during the executing, by the processor, the amended job schedule, wherein the presence of the anomaly increases the updated probability of the job failure occurring to greater than a pre-determined threshold;
resolving, by the processor, the anomaly of the amended job schedule, wherein the resolving eliminates a probability of the job failure automatically, without the input of the operator of the computing system, wherein the resolving includes:
identifying a safe overclocking range based on information recorded in data sources from one or more sensors among the sensors;
increasing a processing power of the each client computer by overclocking a processor or memory of the each client computer based on the identified safe overclocking range; and
in response to the increasing the processing power of the each client computer by overclocking the processor or memory of the each client computer based on the identified safe overclocking range, registering, by the processor, characteristics of the anomaly.

9. The system of claim 8, wherein the pre-planned job schedule includes one or more batches of jobs scheduled to be performed over a duration of time defined by the operator of the computing system.

10. The system of claim 8, wherein the identifying is performed by the processor executing program code for an analytics module performing a statistical analysis of the health and performance information.

11. The system of claim 8, wherein the resolving the anomaly includes delaying performance of a scheduled job from the one or more scheduled jobs, extending an allotted time to perform the scheduled job, rescheduling a performance start time of the scheduled job, reassigning the scheduled job to a different client computer from the network of computers, cancelling the scheduled job or disabling an inoperable client computer from the network of computers.

12. The system of claim 8, wherein the anomaly identified is selected from a group consisting of an overutilization of the computing system's resources, an inoperable client computer from the network of the computers, and insufficient client computer resources.

13. A computer program product, comprising a computer readable storage medium having a computer readable program code stored therein, said program code configured to be executed by a processor of a computing system connected to a network of client computers to perform a method for analytically implementing a predictive job schedule, said method comprising:
retrieving, by the processor, health and performance information of each client computer in the network of computers via sensors measuring and recording the health and performance information, including each client computer's processor speed, memory clock speed and voltage;

generating, by the processor, a pre-planned job schedule having one or more scheduled jobs being performed by the each client computer in the network of computers up to a maximum number of parallel jobs;

identifying, by the processor, the one or more scheduled jobs having an initial probability of a job failure occurring due to insufficient resources available to the network of computers;

amending, by the processor, the pre-planned job schedule to an amended job schedule automatically, without an input by an operator of the computing system, said amended job schedule having an updated probability of the job failure that is less than a pre-determined threshold;

commanding, by the processor, the each client computer of the network of computers that is unassigned to a job of the amended job schedule to enter a low power state;

executing, by the processor, the amended job schedule;

analyzing, by the processor, the amended job schedule for a presence of an anomaly identified during the executing, by the processor, the amended job schedule, wherein the presence of the anomaly increases the updated probability of the job failure occurring to greater than a pre-determined threshold;

resolving, by the processor, the anomaly of the amended job schedule, wherein the resolving eliminates a probability of the job failure automatically, without the input of the operator of the computing system, wherein the resolving includes:

identifying a safe overclocking range based on information recorded in data sources from one or more sensors among the sensors;

increasing a processing power of the each client computer by overclocking a processor or memory of the each client computer based on the identified safe overclocking range; and in response to the increasing the processing power of the each client computer by overclocking the processor or memory of the each client computer based on the identified safe overclocking range, registering, by the processor, characteristics of the anomaly.

14. The computer program product of claim 13 wherein the pre-planned job schedule includes one or more batches of jobs scheduled to be performed over a duration of time defined by the operator of the computing system.

15. The computer program product of claim 13, wherein the identifying is performed by the processor executing program code for an analytics module performing a statistical analysis of the health and performance information.

16. The computer program product of claim 13, wherein the resolving the anomaly includes delaying performance of a scheduled job, extending an allotted time to perform the scheduled job, rescheduling a performance start time of the scheduled job, reassigning the scheduled job to a different client computer from the network of computers, cancelling the scheduled job or disabling an inoperable client computer from the network of computers.

17. The computer program product of claim 13, wherein the anomaly identified is selected from a group consisting of an overutilization of the computing system's resources, an inoperable client computer from the network of computers, and insufficient client system resources.

* * * * *